United States Patent
Midoun et al.

(10) Patent No.: US 9,168,883 B1
(45) Date of Patent: Oct. 27, 2015

(54) RAIL ASSEMBLY FOR A FRAME OF A VEHICLE

(71) Applicant: Ford Global Technologies, LLC, Dearborn, MI (US)

(72) Inventors: Djamal Eddine Midoun, Ann Arbor, MI (US); Laike Misikir, Ann Arbor, MI (US); Shekar Prabhakar Erasala, Northville, MI (US); Matthew B. Makowski, Northville, MI (US); Oliver O. Nwankwo, Canton, MI (US); Bin Zhang, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/475,838

(22) Filed: Sep. 3, 2014

(51) Int. Cl.
*B60R 19/34* (2006.01)
*B62D 21/15* (2006.01)
*B62D 25/08* (2006.01)

(52) U.S. Cl.
CPC .............. *B60R 19/34* (2013.01); *B62D 21/152* (2013.01); *B62D 25/082* (2013.01)

(58) Field of Classification Search
CPC ...... B60R 19/02; B60R 19/023; B60R 19/24; B60R 19/26; B60R 19/34; B62D 21/15; B62D 21/152; B62D 25/08; B62D 25/082; B62D 25/085
USPC ................ 293/132, 133; 296/187.03, 187.09, 296/193.09, 203.01, 203.02, 205
See application file for complete search history.

(56) References Cited

U.S. PATENT DOCUMENTS

| | | | | | |
|---|---|---|---|---|---|
| 3,697,108 | A | * | 10/1972 | Diener .......................... | 293/133 |
| 4,624,493 | A | * | 11/1986 | Hillebrand et al. ........... | 293/136 |
| 4,929,008 | A | * | 5/1990 | Esfandiary .................... | 293/108 |
| 6,010,155 | A | | 1/2000 | Rinehart | |
| 7,677,617 | B2 | * | 3/2010 | Stewart et al. ................ | 293/133 |
| 8,662,546 | B2 | | 3/2014 | Kizaki et al. | |
| 2005/0104391 | A1 | * | 5/2005 | Browne et al. ................ | 293/132 |
| 2006/0022473 | A1 | * | 2/2006 | Hansen ......................... | 293/133 |
| 2010/0066124 | A1 | | 3/2010 | Terada et al. | |
| 2013/0119682 | A1 | * | 5/2013 | Matuschek et al. ........... | 293/133 |
| 2014/0117685 | A1 | | 5/2014 | Honda et al. | |

FOREIGN PATENT DOCUMENTS

| DE | 102008013832 A1 | * | 9/2009 |
|---|---|---|---|
| JP | 201480090 A | | 5/2014 |

* cited by examiner

*Primary Examiner* — Jason S Daniels
(74) *Attorney, Agent, or Firm* — Jason C. Rogers; Bejin Bieneman PLC

(57) ABSTRACT

A rail assembly for a frame of a vehicle includes a rail defining a cavity. The cavity extends along an axis for receiving an energy absorbing member of a bumper assembly. A brace is fixed to the rail and includes a side wall extending along the axis in the cavity. The brace includes an end wall extending from the side wall in the cavity transversely to the axis adjacent to the energy absorbing member in the cavity. The rail defines a hole and the brace defines a hole aligned with the hole of the rail for receiving a fastener to engage the energy absorbing member.

20 Claims, 5 Drawing Sheets

RAIL ASSEMBLY FOR A FRAME OF A VEHICLE

BACKGROUND

An end structure of a vehicle includes a cross vehicle structure, e.g., a front bumper assembly or a rear bumper assembly, connected to a frame of the vehicle. In particular, the frame of the vehicle includes rails and cross-members extending between the rails, and the bumper assembly may be connected to the rails. The bumper assembly may include a bumper beam and a fascia covering the bumper beam. The bumper beam is relatively rigid, e.g., formed of metal, and may be engaged by an object during a collision with the object. The fascia is relatively pliable and provides an aesthetic exterior appearance.

Crash cans may connect the bumper beam to the rails. The crash cans may be directly connected to the rails. For example, the crash can and the rail may present flanges that abut each other and are fixed to each other with fasteners, e.g., threaded bolts. The crash cans are designed to crumple. The collapse of the crash can absorb energy upon impact of the bumper beam with an object during a collision. For example, during a collision, the crash can may collapse to about 70-80% of a pre-collision length.

The crush cans are designed to separate the bumper beam from a back panel of the body that extends between the frame and the bumper beam. The back panel is deformable relative to the bumper beam, e.g., is sheet metal, such that contact between the bumper beam and the back panel damages the back panel. In such situations, the back panel must be repaired or replaced, which is costly and negatively affects the performance rating of the vehicle during a low speed damageability (LSD) test. The LSD test is a standardized test event measuring the amount of damage to a vehicle during a low speed impact.

For aesthetic purposes, some vehicles are designed with tight packaging constraints in the bumper assembly, e.g., low profile bumper assemblies. However, these tight packaging constraints reduce the amount of space for crash cans.

As such, there remains an opportunity to develop an improved end structure to have satisfactory performance as the bumper beam approaches the rail and back panel, and to have satisfactory performance during LDS tests.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Figure 1:
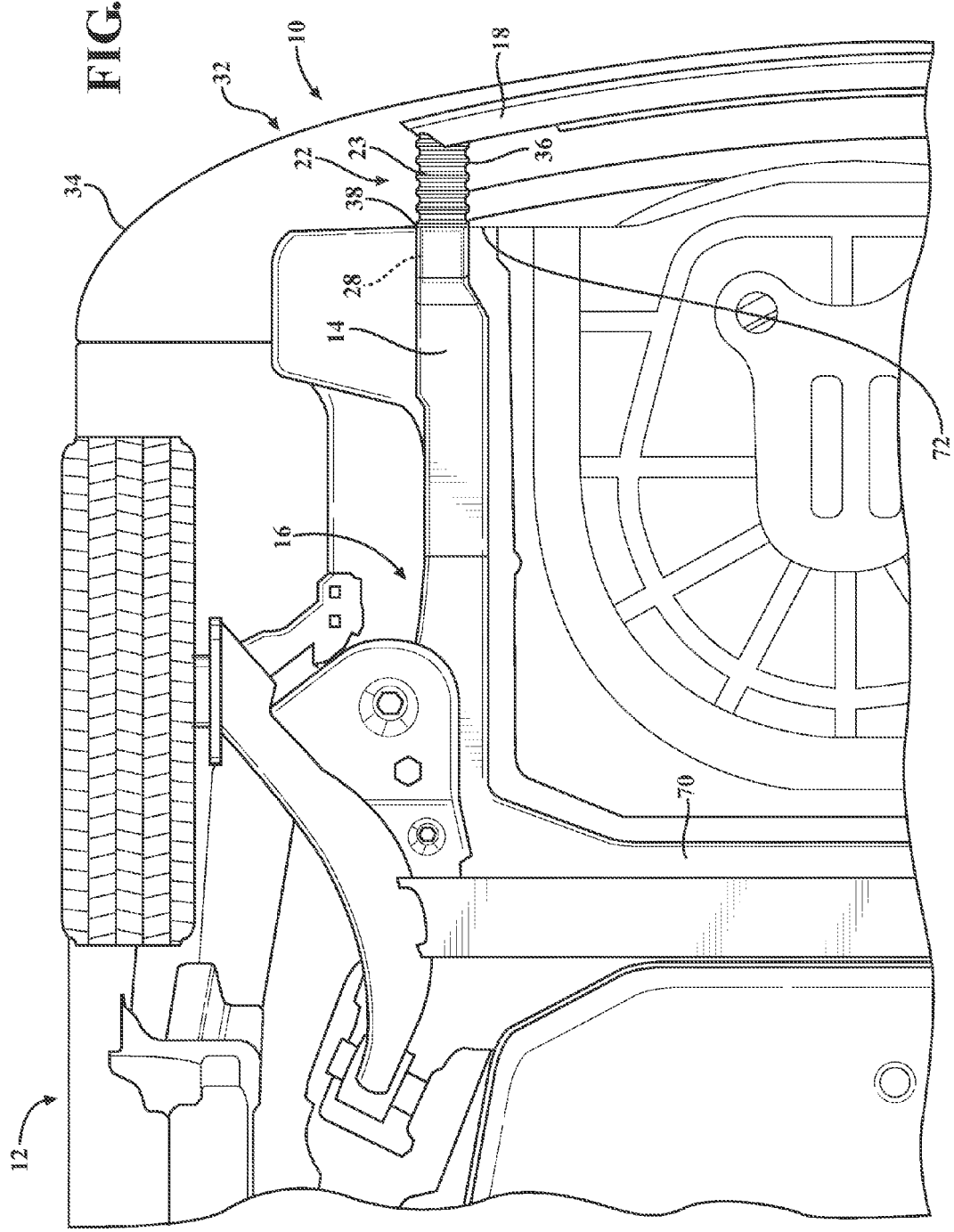
FIG. 1 is a bottom view of a vehicle including an end structure having a rail of a frame of the vehicle, a bumper beam spaced from the rail, and an energy absorbing member connecting the bumper beam to the frame.
Figure 2:
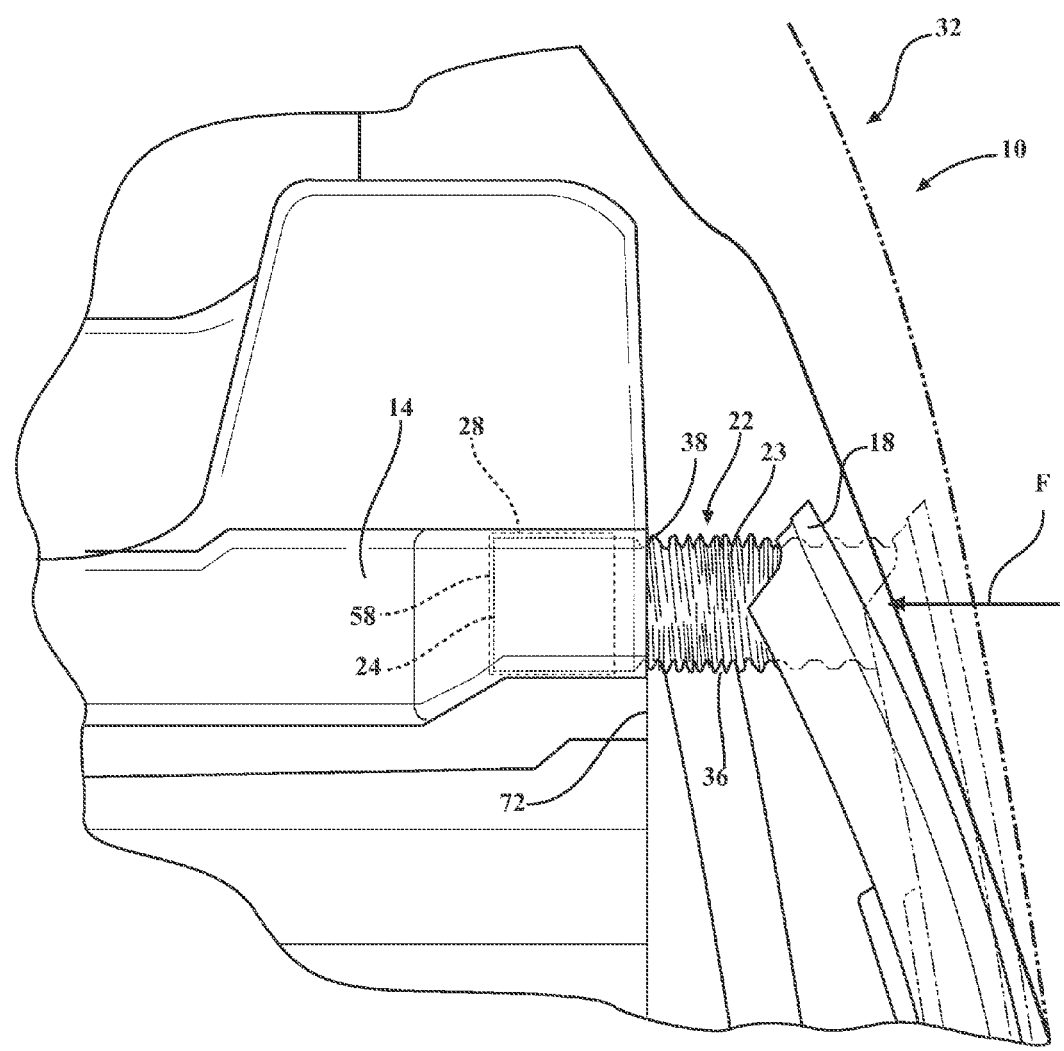
FIG. 2 is a magnified view of a portion of the end structure during a collision.

With reference to the Figures, wherein like numerals indicate like parts throughout the several views, an end structure 10 for a vehicle 12 includes a rail 14 of a frame 16 of the vehicle 12 and a bumper beam 18 spaced from the rail 14, as shown in FIG. 1. With reference to FIG. 2, the rail 14 defines a cavity 20. An energy absorbing member 22 extends from a proximal end 24 disposed in the cavity 20 to a distal end 26 coupled to the bumper beam 18. A brace 28 is disposed in the cavity 20. The brace 28 is fixed to the rail 14 and the energy absorbing member 22 for distributing forces between the rail 14 and the energy absorbing member 22. With reference to FIG. 1, a rail assembly 30 of the frame 16 of the vehicle 12 includes the rail 14 and the brace 28. A bumper assembly 32 may include the bumper beam 18 and a fascia 34 covering the bumper beam 18.

The energy absorbing member 22 is configured to compress along an axis A. The energy absorbing member 22 may be, for example, a crash can 23, as shown in the Figures. With reference to FIG. 2, the crash can 23 is configured to crumple along the axis A to absorb energy upon impact of the bumper beam 18 with an object during a collision. For example, the crash can 23 may include a corrugated section 36 configured to collapse when sufficient axial force is applied to the corrugated section 36. Alternatively, the energy absorbing member 22 may be a hydraulic energy absorber that is resiliently compressible along the axis A.

Figure 3:
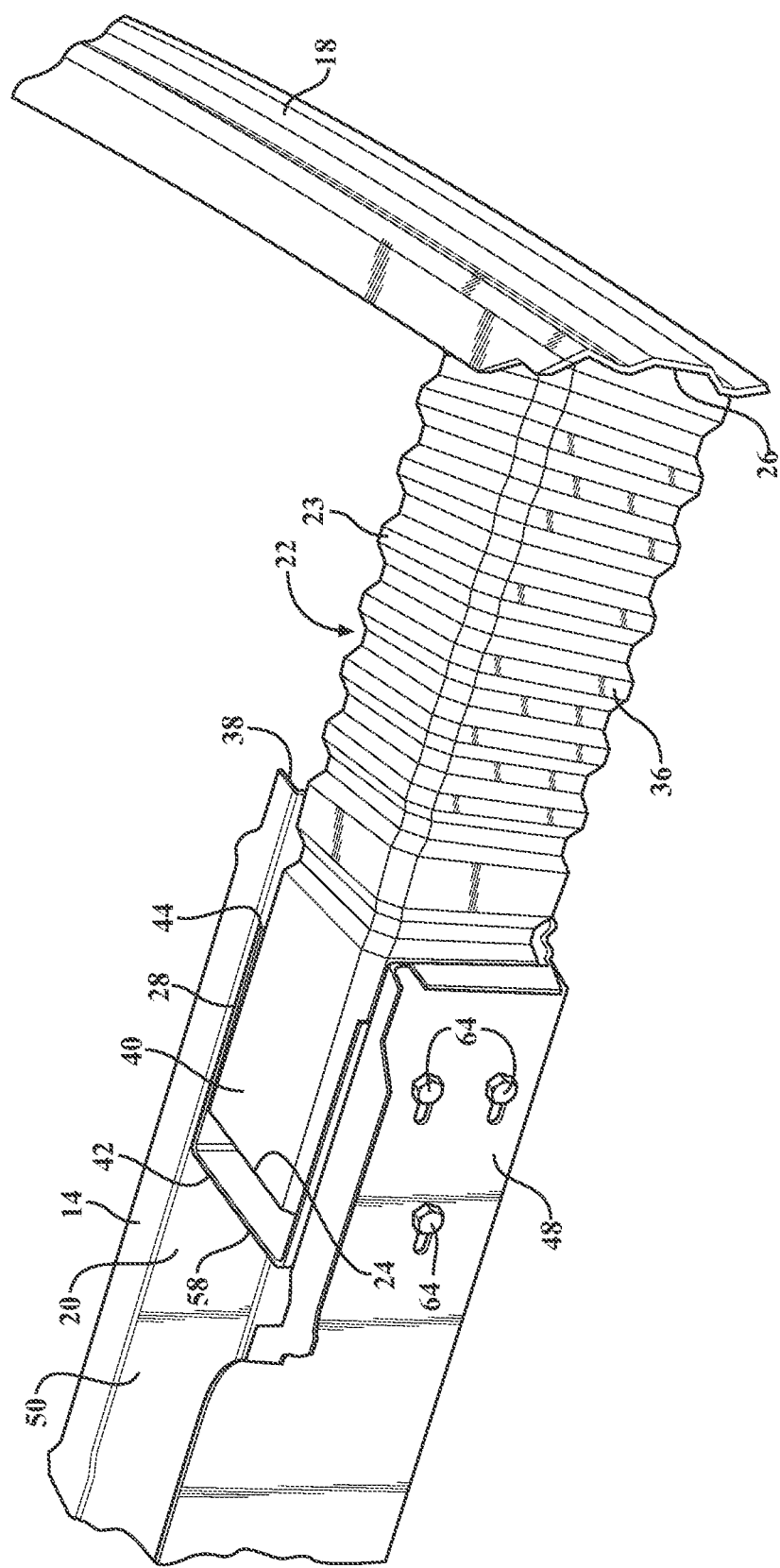
FIG. 3 is a perspective view of a portion of the end structure including a brace fixed to the rail and the energy absorbing member.

Since the proximal end 24 of the energy absorbing member 22 is disposed in the cavity 20, as shown in FIG. 3, at least a portion of the energy absorbing member 22 may compress into the cavity 20 during impact of the bumper beam 18 during a collision. For example, the crash can 23 may crumple into the cavity 20 during the impact. In other words, material of the crash can 23 may build up as the crash can 23 crumples, and at least a portion of this built-up material may collapse into the cavity 20. This may allow increased movement of the bumper beam 18 and reduces the likelihood of the bumper beam 18 damaging a back panel 72 of the vehicle 12 during low speed collision and the high cost associated with replacement or repair of the back panel 72. In particular, the back panel 72 may be a portion of a body of the vehicle 12 and is disposed adjacent the rail 14, e.g., between the frame 16 and the bumper beam 18. The back panel 72 is deformable relative to the bumper beam 18 such that contact between the bumper beam 18 and the back panel 72 damages the back panel 72. For example, the bumper beam 18 may be formed of metal, such as steel, aluminum, etc., and the back panel 72 may be formed of relatively deformable sheet metal. The extension of the crash can 22 into the cavity 20 and the axial deformation of the energy absorbing member 22, e.g., the crumple of the crash can 22, into the cavity 20 increases the length of the energy absorbing member 22 and thus increases the energy absorbing capability of the energy absorbing member 22. In other words, the extension of the energy absorbing member 22 into the cavity 20 increases the stroke of the energy absorbing member 22. The energy absorbing member 22 extends into the cavity 20 to allow for reduced space between the bumper beam 18 and the frame 16, e.g., for a low profile end structure 10 and reduces the likelihood of contact between the bumper beam 18 and the back panel 72. This reduction in the likelihood of contact between the bumper beam 18 and the back panel 72, and the damage associated therewith, is beneficial to LSD testing.

The distribution of forces between the rail 14 and the energy absorbing member 22 by the brace 28 reduces the likelihood of damage to the rail 14 and/or the back panel 72 during a collision and the high cost associated with repairing damage to the rail 14. This reduction in the likelihood of damage to the rail 14 is beneficial during LSD testing.

With continued reference to FIG. 1, the energy absorbing member 22 is spaced from the rail 14. In other words, the brace 28 is disposed between the energy absorbing member 22 and the rail 14 and the brace 28 spaces the energy absorbing member 22 from the rail 14. This configuration reduces the likelihood of damage to the rail 14 by the energy absorbing member 22 during a collision and the cost of repair associated therewith, and is beneficial to the results of LSD testing.

Figure 4:
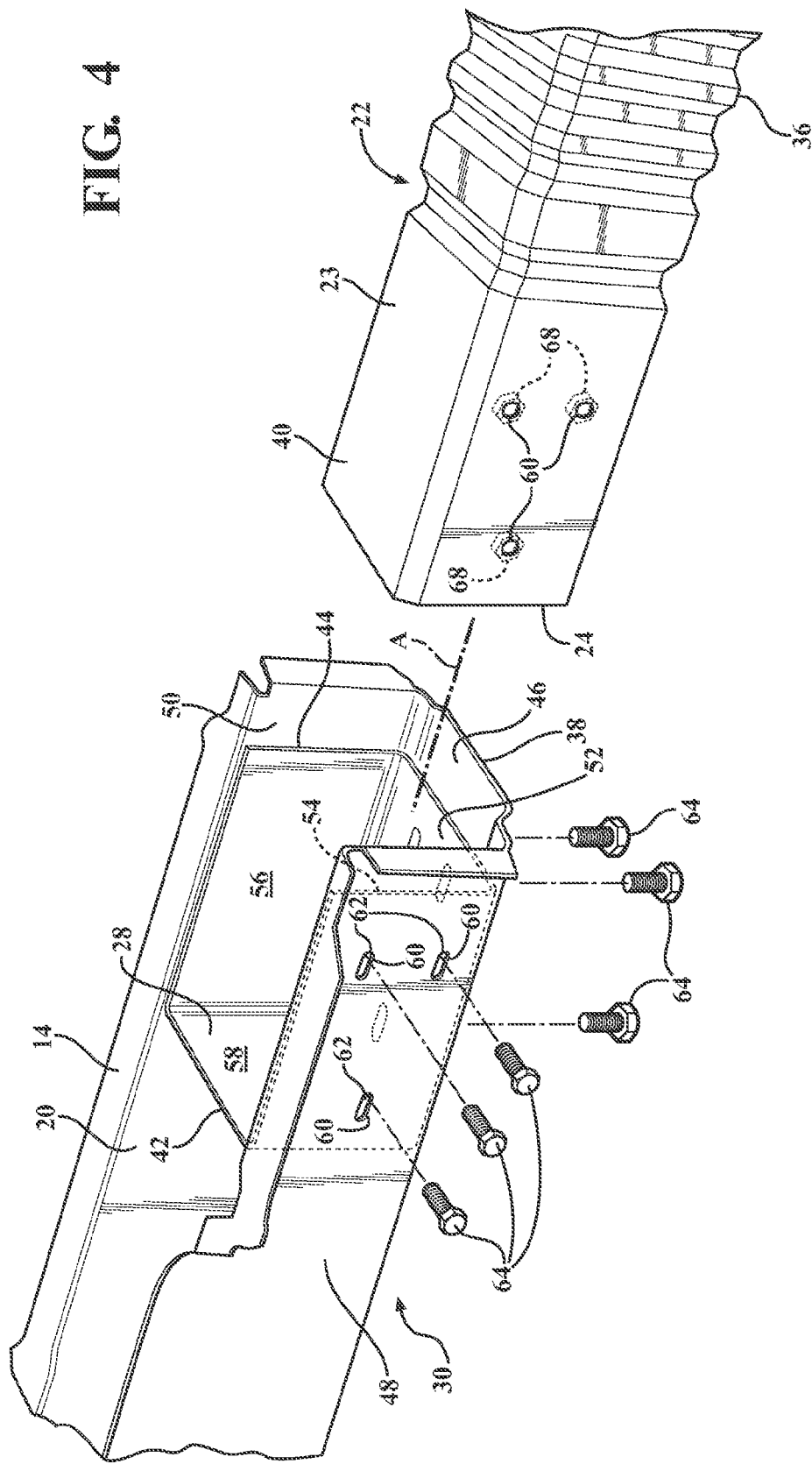
FIG. 4 is an perspective view of a portion of the end structure with the energy absorbing member exploded from the rail and the brace.

With reference to FIG. 4, the rail 14 presents an end 38 defining the cavity 20. The cavity 20 extends along the axis A for receiving the energy absorbing member 22. The energy absorbing member 22 may extend into the cavity 20 along the axis A. The energy absorbing member 22 telescopically extends from the cavity 20 of the rail 14. An end portion 40 of the energy absorbing member 22 extends along the axis A in the cavity 20. The end portion 40 engages the brace 28 in the cavity 20.

As shown in FIGS. 3 and 4, the brace 28 is recessed into the cavity 20 spaced from the end 38 of the rail 14. Specifically, the brace 28 extends between a first end 42 and a second end 44 disposed between the first end 42 and the end of the rail 14. The second end 44 of the brace 28 is recessed into the cavity 20, i.e., is spaced from the end 38 of the rail 14 in the cavity 20. As such, the material of the energy absorbing member 22 that builds up as the energy absorbing member 22 collapses into the cavity 20, e.g., as the crash can 23 crumples into the cavity 20, as set forth above.

With reference to FIG. 4, the rail 14 may include a first wall 46, a second wall 48, and a third wall 50, as shown in FIGS. 3 and 4. The first wall 46, second wall 48, and third wall 50 may form a U-shaped cross-section for receiving the brace 28 therebetween. The first wall 46, second wall 48, and third wall 50 may define the cavity 20 to be rectangular in cross-section. The rail 14 may include a fourth wall (not shown) connecting between the second wall 48 and third wall 50, for example. The rail 14 may include any suitable number of walls and may have any suitable cross-sectional shape.

As set forth above, the brace 28 is fixed to the rail 14 in the cavity 20, as shown in FIG. 4. The brace 28 may be welded to the rail 14 in the cavity 20. Alternatively, the brace 28 may be fixed to the rail 14 in any suitable fashion. The brace 28 may be a metal, such as steel, aluminum, etc.

Figure 5:
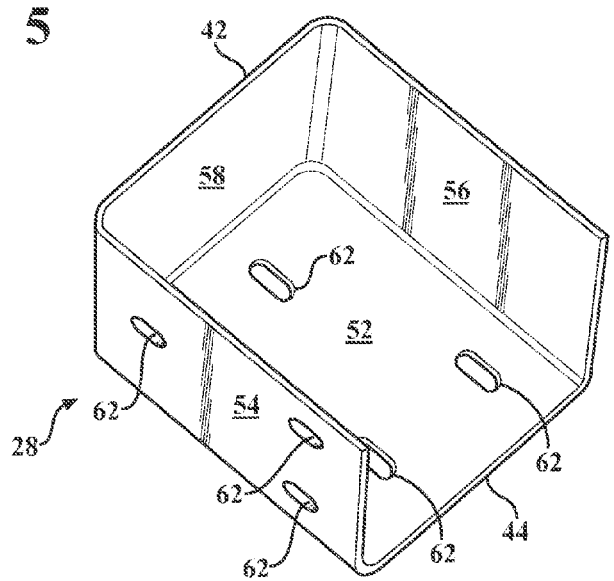
FIG. 5 is a perspective view of the brace.

With reference to FIG. 5, the brace 28 may define a U-shaped cross-section for receiving the energy absorbing member 22. In particular, the brace 28 includes a side wall 52, a second side wall 54 extending transversely from the side wall 52, and a third side wall 56 extending transversely from the side wall 52. The brace 28 may include any suitable number of side walls. The side wall 52, second side wall 54, and third side wall 56 each extend along the axis A in the cavity 20 between the rail 14 and the energy absorbing member 22.

The third side wall 56 is spaced from the second side wall 54 for receiving the energy absorbing member 22 between the second side wall 54 and the third side wall 56. The second side wall 54 and the third side wall 56 may be parallel to each other and perpendicular to the side wall 52.

The brace 28 includes an end wall 58 extending from the side wall 52 transversely to the axis A for being adjacent the energy absorbing member 22 in the cavity 20. The end wall 58 is disposed in the cavity 20 and the energy absorbing member 22 is disposed between the end wall 58 and the rail 14. As set forth below, the proximal end 24 of the energy absorbing member 22 may be spaced from the end wall 58 of the brace 28 in the cavity 20 prior to a collision, as shown in FIG. 3, and may contact the end wall 58 during the collision, as shown in FIG. 2.

With reference to FIG. 5, the end wall 58 extends transversely to the side wall 52, second side wall 54, and third side wall 56. The end wall 58 may be connected to each of the side wall 52, second side wall 54, and third side wall 56.

With reference to FIGS. 4 and 5, the rail 14 defines a hole 60 and the brace 28 defines a hole 62 aligned with the hole 60 of the rail 14. The holes 60, 62 may be elongated along the axis A, as shown in FIGS. 3-5. The rail 14 and the brace 28 may define a plurality of aligned holes 60, 62. For example, as shown in FIG. 4, the second wall 48 of the rail 14 and the second side wall 54 of the brace 28 defines holes 60, 62 aligned with each other. As shown in FIG. 5, the side wall 52 defines holes 62 and, although not shown in the Figures, the first wall 46 of the rail 14 may define holes 60 aligned with the holes 62 in the side wall 52. Although not shown in the Figures, the third side wall 56 of the brace 28 and the third wall 50 of the rail 14 may define aligned holes 60, 62.

With reference to FIGS. 3 and 4, fasteners 64 extend through each of the aligned holes 60, 62 and engage the energy absorbing member 22. The fasteners 64 fix the end portion 40 of the energy absorbing member 22 to the brace 28. The fasteners 64 may be removed to disengage the energy absorbing member 22 from the rail 14 if replacement of the energy absorbing member 22 is necessary, e.g., if the crash can 23 is crumpled during a collision.

Figure 6:
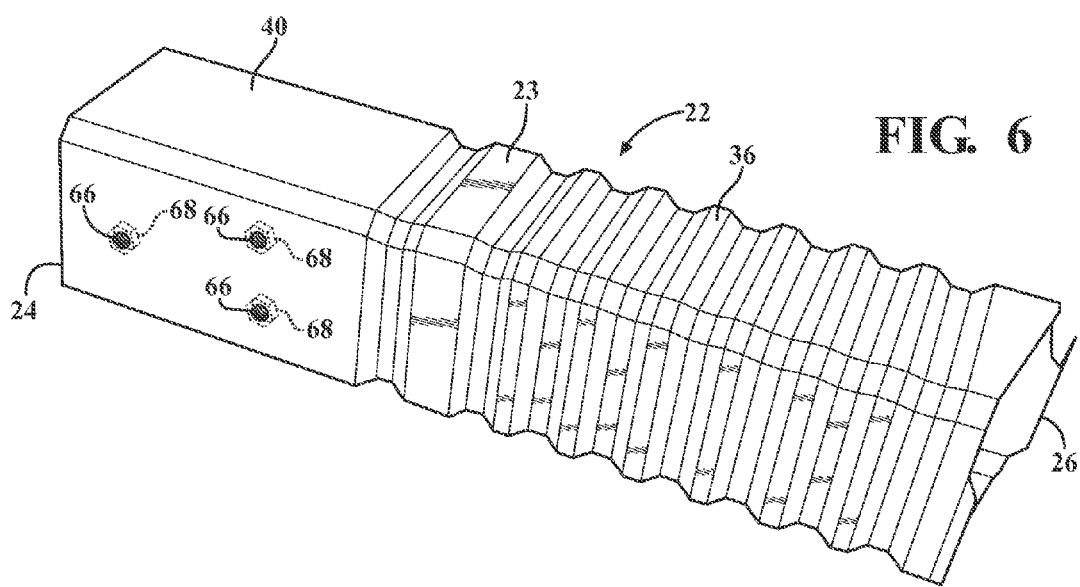
FIG. 6 is a perspective view of the energy absorbing member.

The fasteners 64 may be threaded fasteners, as shown in FIGS. 3 and 4, and the energy absorbing member 22 may define threads 66 for engaging the fasteners 64. For example, the fasteners 64 may be bolts and the energy absorbing member 22 may include weld nuts 68, as shown in FIG. 6, presenting the threads 66.

Three fasteners 64 through the side wall 52 and three fasteners 64 through the second side wall 54 may be sufficient to withstand shear forces associated with a collision. The distribution of forces between the rail 14 and the energy absorbing member 22 by the brace 28 allows for this number of fasteners 64 to sufficiently withstand the shear forces. However, the walls of the rail 14 and the side walls 52 of the brace 28 may define any suitable number of holes 60, 62 and any suitable number of fasteners 64.

The vehicle 12 may be any type of vehicle 12, such as an automobile. The end structure 10 may be at the front of the vehicle 12 or the rear of the vehicle 12. In other words, the bumper assembly 32 may be a front bumper assembly 32 or a rear bumper assembly 32.

The frame 16 may be of any suitable type. The frame 16 may include more than one rail assembly 30 (one of which is shown in FIG. 1) and cross-members 70 (one of which is shown in FIG. 1) extending between the rail 14 assemblies. For example, the frame 16 may include two rail 14 assemblies each including a rail 14, brace 28, and energy absorbing member 22. In such a scenario, the rail 14 and the brace 28 of the two rail 14 assemblies may be mirror images of each other.

In operation, the energy absorbing member 22 is fastened to the brace 28 and the rail 14 with the fasteners 64 through the holes 60, 62. In normal operation, e.g., before a collision, the proximal end 24 of the energy absorbing member 22 is spaced from the end wall 58 of the brace 28, as shown in FIG. 3. During a collision, as shown in FIG. 2, a force F is applied to the bumper beam 18. Under the application of the force F, the fasteners 64 slide along the holes 60, 62 along the axis A toward the end wall 58 of the brace 28 until the proximal end 24 contacts the end wall 58. When the proximal end 24 contacts the end wall, the energy absorbing member 22 crumples, as shown in FIG. 2.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An end structure for a vehicle, the end structure comprising:
    a rail defining a cavity;
    a bumper beam spaced from the rail;
    an energy absorbing member extending from a proximal end disposed in the cavity to a distal end coupled to the bumper beam; and
    a brace disposed in the cavity and fixed to the rail and the energy absorbing member for distributing forces between the rail and the energy absorbing member;
    wherein the cavity extends along an axis and the brace includes a side wall extending along the axis in the cavity between the rail and the energy absorbing member; and
    wherein the brace includes an end wall extending from the side wall transversely to the axis in the cavity with the energy absorbing member disposed between the end wall and an end of the rail.

2. The end structure as set forth in claim 1 wherein the rail presents an end defining the cavity and wherein the brace is recessed into the cavity spaced from the end of the rail.

3. The end structure as set forth in claim 1 wherein the brace is welded to the rail.

4. The end structure as set forth in claim 1 wherein the rail defines a hole and the side wall defines a hole aligned with the hole of the rail, wherein a fastener extends through the holes and engages the energy absorbing member.

5. The end structure as set forth in claim 4 wherein the energy absorbing member includes a hole aligned with the hole in the rail and the side wall and receiving the fastener.

6. The end structure as set forth in claim 4 wherein the holes in at least one of the rail and the side wall are elongated along the axis.

7. The end structure as set forth in claim 1 wherein the brace includes a second side wall extending transversely from the side wall and a third side wall extending transversely from the side wall spaced from the second side wall, the brace receiving the energy absorbing member between the second side wall and the third side wall.

8. The end structure as set forth in 7 wherein the rail defines a hole and at least one of the side wall, the second side wall, and the third side wall defines a hole aligned with the hole of the rail, wherein a fastener extends through the holes and engages the energy absorbing member.

9. The end structure as set forth in claim 1 wherein the second side wall and the third side wall are parallel.

10. A rail assembly for a frame of a vehicle, the rail assembly comprising:
    a rail defining a cavity extending along an axis for receiving an energy absorbing member of a bumper assembly; and
    a brace fixed to the rail and including a side wall extending along the axis in the cavity and an end wall extending from the side wall in the cavity transversely to the axis for being adjacent the energy absorbing member in the cavity; and
    the rail defining a hole and the brace defining a hole aligned with the hole of the rail for receiving a fastener to engage the energy absorbing member;
    wherein the cavity extends along an axis and the brace includes a side wall extending along the axis in the cavity between the rail and the energy absorbing member; and
    wherein the brace includes an end wall extending from the side wall transversely to the axis in the cavity for receiving the energy absorbing member between the end wall and an end of the rail.

11. The rail assembly as set forth in claim 10 wherein the rail presents an end defining the cavity and wherein the brace is recessed into the cavity spaced from the end of the rail.

12. The rail assembly as set forth in claim 10 wherein the brace is welded to the rail.

13. The rail assembly as set forth in claim 10 wherein the rail defines a hole and the side wall defines a hole aligned with the hole of the rail for receiving a fastener to engage the energy absorbing member.

14. The end structure as set forth in claim 13 wherein the holes in at least one of the rail and the side wall are elongated along the axis.

15. The rail assembly as set forth in claim 10 wherein the brace includes a second side wall extending transversely from the side wall and a third side wall extending transversely from the side wall spaced from the second side wall for receiving the energy absorbing member therebetween.

16. The rail assembly as set forth in 15 wherein the rail defines a hole and at least one of the side wall, the second side wall, and the third side wall defines a hole aligned with the hole of the rail for receiving a fastener to engage the energy absorbing member.

17. An end structure for a vehicle, the end structure comprising:
    a rail defining a cavity;
    a bumper beam spaced from the rail;
    an energy absorbing member extending from a proximal end disposed in the cavity to a distal end coupled to the bumper beam; and
    a brace disposed in the cavity and fixed to the rail and the energy absorbing member for distributing forces between the rail and the energy absorbing member;
    wherein the cavity extends along an axis and the brace includes a side wall extending along the axis in the cavity between the rail and the energy absorbing member; and
    wherein the brace includes a second side wall extending transversely from the side wall and a third side wall extending transversely from the side wall spaced from the second side wall, the brace receiving the energy absorbing member between the second side wall and the third side wall.

18. The end structure as set forth in 17 wherein the rail defines a hole and at least one of the side wall, the second side wall, and the third side wall defines a hole aligned with the hole of the rail, wherein a fastener extends through the holes and engages the energy absorbing member.

19. A rail assembly for a frame of a vehicle, the rail assembly comprising:
    a rail defining a cavity extending along an axis for receiving an energy absorbing member of a bumper assembly; and
    a brace fixed to the rail and including a side wall extending along the axis in the cavity and an end wall extending from the side wall in the cavity transversely to the axis for being adjacent the energy absorbing member in the cavity; and the rail defining a hole and the brace defining a hole aligned with the hole of the rail for receiving a fastener to engage the energy absorbing member;

wherein the brace includes a second side wall extending transversely from the side wall and a third side wall extending transversely from the side wall spaced from the second side wall for receiving the energy absorbing member therebetween.

20. The rail assembly as set forth in 19 wherein the holes in at least one of the rail and the brace are elongated along the axis.

* * * * *